United States Patent [19]

Northrop et al.

[11] Patent Number: 5,331,085

[45] Date of Patent: Jul. 19, 1994

[54] METHOD FOR INCREASING VISCOSITY UNIFORMITY IN POLYCARBONATE MANUFACTURE

[75] Inventors: Randy Northrop, Evansville; Kent Wenderoth, Wadesville, both of Ind.

[73] Assignee: General Electric Company, Pittsfield, Mass.

[21] Appl. No.: 69,043

[22] Filed: May 28, 1993

[51] Int. Cl.⁵ ............................................. C08G 64/40
[52] U.S. Cl. .................................... 528/491; 525/462; 528/196; 528/502
[58] Field of Search ...................... 528/491, 502, 196; 525/462

[56] References Cited

U.S. PATENT DOCUMENTS 4,603,194  7/1986  Mendiratta et al. ................ 528/491

Primary Examiner—Harold D. Anderson

[57] ABSTRACT

Polycarbonate batches dissolved in dichloromethane and having a solids content ranging from about 10 to about 30 weight percent are solution blended in a vessel. The batch-to-batch viscosity (MW) variability is reduced by about 40 to about 260 percent. The invention is effective with polycarbonate materials in the molecular weight range of about 15,000 to about 100,000 amu, regardless of chain terminator, co-monomer or branching agents used.

14 Claims, 4 Drawing Sheets

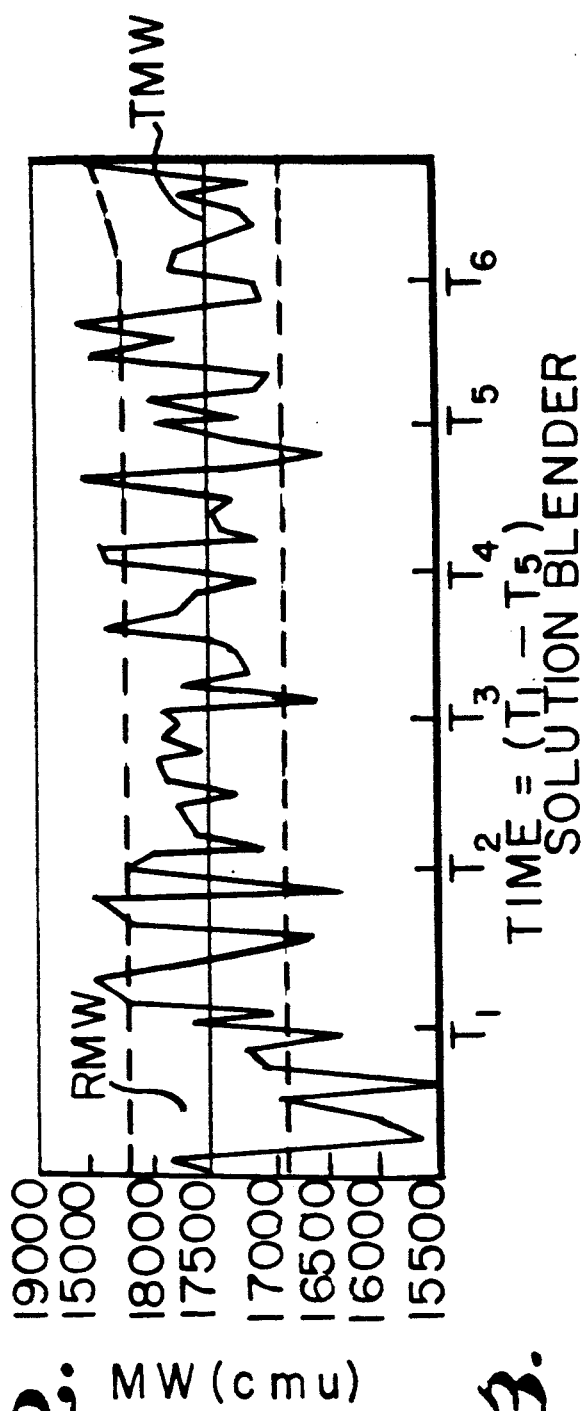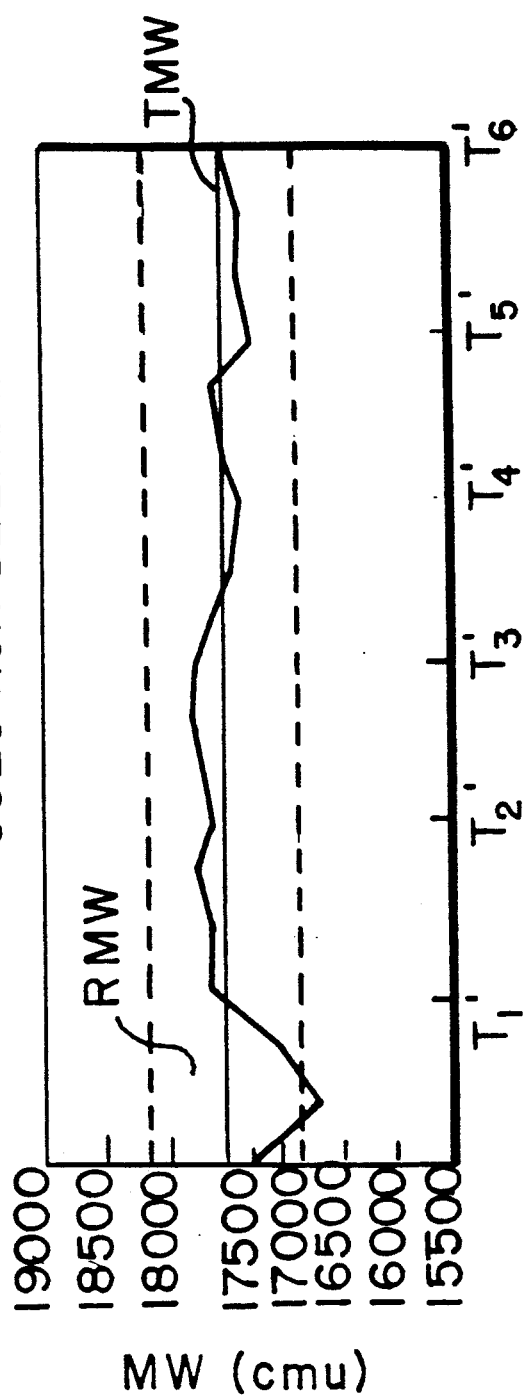
Fig. 2.
Fig. 3.

METHOD FOR INCREASING VISCOSITY UNIFORMITY IN POLYCARBONATE MANUFACTURE

BACKGROUND OF THE INVENTION

The invention pertains to a method and apparatus for reducing batch-to-batch variability in the manufacture of polycarbonate resins and, in particular, to solution blending of polycarbonate batches prior to the recovery of polycarbonate powder by precipitation, concentration and drying.

Polycarbonates (PC) are manufactured by the interfacial reaction of bisphenols, for example, bisphenol-A (BPA) in a methylene chloride and water carrier, with phosgene in a two phase reaction medium including inorganic caustic (e.g. NaOH) and an organic solvent (e.g. dichloromethane).

Variations in the amounts of reactants and the end capping have resulted in batch-to-batch viscosity (e.g. molecular weight) variations in the final polycarbonate product. These variations can result in significant processing difficulties for the end user.

A known method for alleviating viscosity variability has been to combine batches of the finished product, i.e., polycarbonate powder, and dry blend the material in a vessel. The method is somewhat effective to reduce batch-to-batch variability, however, lot-to-lot variability is greater than desired and creates processing problems for the end user. The dry blending expedient is also inefficient. Finally, dry blending is usually effected at the compounding location which is different from the manufacturing location. This reduces productivity and process cost effectiveness both in terms of operational and capital requirements.

It is therefore desirable to decrease the batch-to-batch viscosity variability (e.g. MW) inherent in the batch interfacialpolycarbonate manufacturing process.

SUMMARY OF THE INVENTION

The present invention is based upon the discovery that post reaction solution blending of the polycarbonate product can decrease the batch-to-batch viscosity variability significantly. In a particular embodiment, the polycarbonate is dissolved in a solvent, e.g., dichloromethane. The solution has a solids content ranging from about 10 to about 30 weight percent. Solution blending results in a batch-to-batch viscosity variability reduction in a range from about 40 percent to about 260 percent. The invention is effective with polycarbonate materials in the molecular weight range of about 15,000 to about 100,000 amu, regardless of chain terminator, co-monomer or branching agents used. The process modification of the present invention results in a higher quality polycarbonate, in that, the batch-to-batch viscosity variability is significantly reduced which results in improved processing ability for the end user.

In one embodiment of a batch interfacial polycarbonate process, a continuous stirred tank reactor, or the like, capable of holding the contents of multiple polycarbonate reactor batches receives a polymer reaction product prior to polymer recovery. The reaction product of multiple batches is continuously combined whereby viscosity (e.g., molecular weight) variability significantly decreases.

In a particular embodiment, the invention is directed to a process for treating polycarbonate to reduce batch-to-batch variations in viscosity, said process comprising:

mixing successive batches of said polycarbonate in dichloromethane to form a solution containing from about 10 to about 30 weight percent solids;

blending said mixture for a time period sufficient to reduce batch-to-batch variations in viscosity of said polycarbonate after recovery of said polycarbonate from said solution; and recovering said polycarbonate from said solution after said blending step.

The time period is generally a function of the volume of the mixing vessel and the feed rate of product thereto. Viscosity variability may be reduced significantly by, for example, 50–200% with the solution blending technique of the present invention in time periods practical for commercial polycarbonate production schedule, e.g., 1–10 hours. Even greater improvements can be achieved if residence time is not considered. Also, the technique of the invention is useful to reduce variations in branched polycarbonates and in co-monomers added to the basic composition.

BRIEF DESCRIPTION OF THE DRAWINGS

FIG. 2 is a graphical representation of batch-to-batch molecular weight variability of the polycarbonate product produced in the process illustrated in FIG. 1 prior to solution blending;

FIG. 3 is a graphical representation of the batch-to-batch molecular weight variability of polycarbonate produced in the process illustrated in FIG. 1 after solution blending;

DESCRIPTION OF THE INVENTION

Figure 1:
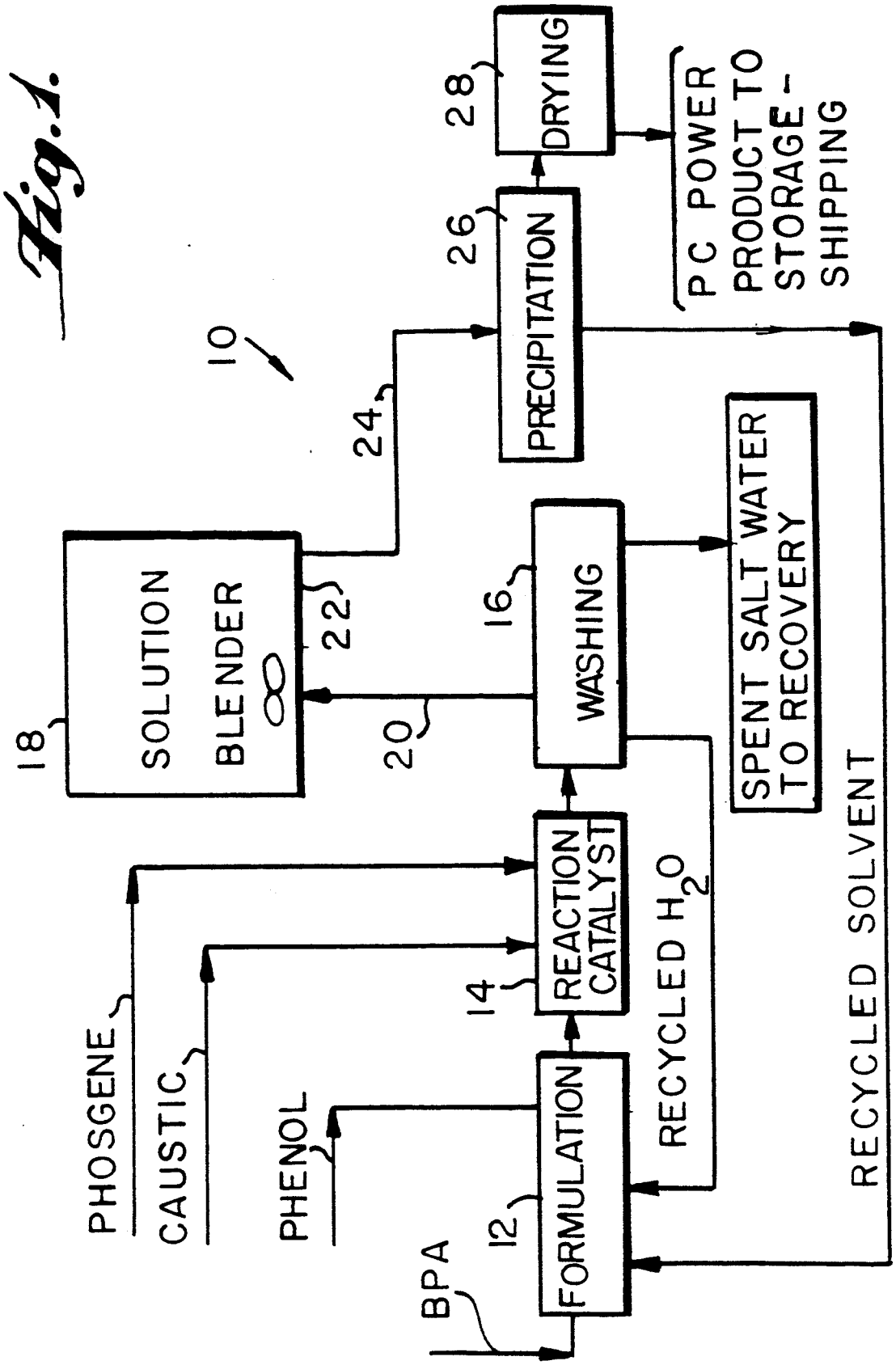
FIG. 1 is a schematic block diagram illustrating the interfacial process for the manufacture of polycarbonate incorporating solution blending in accordance with the present invention.

FIG. 1 illustrates, in schematic block form, the manufacture of polycarbonate by the interfacial reaction of bisphenols in a methylene chloride and water with phosgene in a two phase reaction medium including an inorganic caustic (e.g., NaOH) and an organic solvent (e.g., dichloromethane). In FIG. 1, BPA and a phenol are combined in a formulation vessel 12 to a selected solids level (e.g. 10–30 weight percent BPA solids). Vessel 12 also receives recycled solvent and water as shown. In a reaction vessel 14, the BPA in the methylene chloride and water carrier, is combined with phosgene gas, an amine catalyst (e.g. triethylamine) and an inorganic caustic (e.g. NaOh) to produce polycarbonate which is purified with water in one or more purification stages 16. A solution blender 18 receives polycarbonate on a batch-by-batch basis at its input 20. The combined batches are mixed, for example, by means of a mixing element 22 and the output of the solution blender 18 is coupled to a series of precipitation vessels 26 in which solvent is removed by known processes, for example, by steam precipitation. The solvent is recycled to the formulation tank 12, as shown, and spent salt water from the reaction is recovered from the washing stage 16 as shown. Thereafter, the product is coupled to a dryer 28 and discharged in powdered form to a storage or shipping location.

FIGS. 2 and 3 are exemplary graphical representations of molecular weight in atomic mass units (amu) versus time units T1-T6 and T1'-T6', respectively. In these examples, each time unit is approximately eight hours.

The intervals, T1'-T6', are offset from T1-T6 by about 7-8 hours. The T1-T1' time offset allows for a run change from one molecular weight product to another. The input to tank 18 is represented by FIG. 2. The output is represented by FIG. 3. The exemplary time offset (e.g., 8 hours) between times T1-T6 and corresponding times T1'-T6' is dependent on the residence time in the solution blender 18, i.e., the feed rate into the tank and the tank level. FIG. 3 is a plot of molecular weight of a solution blended polycarbonate taken at the output 24 of the solution blender 18 of FIG. 1.

Molecular weight as used herein is a good indicator of viscosity. Molecular weights are given in atomic mass units (amu) and are derived by gel permeation chromatography (GPC). The measurements are taken from samples of unblended polycarbonate before solution blending at the input 20 of the blender 18, and for samples of blended polycarbonate batches at the output 24 of the blender 18.

In FIGS. 2 and 3, a target molecular weight TMW is desired. In order to be within some given specification for the material, a molecular weight range RMW may be selected. In FIGS. 2 and 3, the TMW is about 17500 amu±700 amu. RMW is shown graphically as the region between the dotted lines. In FIG. 2, many measurements are out of the RMW. In FIG. 3, all of the measurements except one are within the RMW. As can be readily appreciated, after a residence time of approximately eight hours at time T1', the solution blended materials have a molecular weight which stabilizes near TMW. In FIG. 3, during the time prior to T1', the grade of type of product was changed, hence the large fluctuation in molecular weight is seen. However, the molecular weight of the blend varies wholly within the molecular weight range (RMW) after (T1'). A comparison of FIGS. 2 and 3 shows that the solution blending technique of the present invention eliminates the large batch-to-batch of fluctuations after the grade change.

Figure 4:
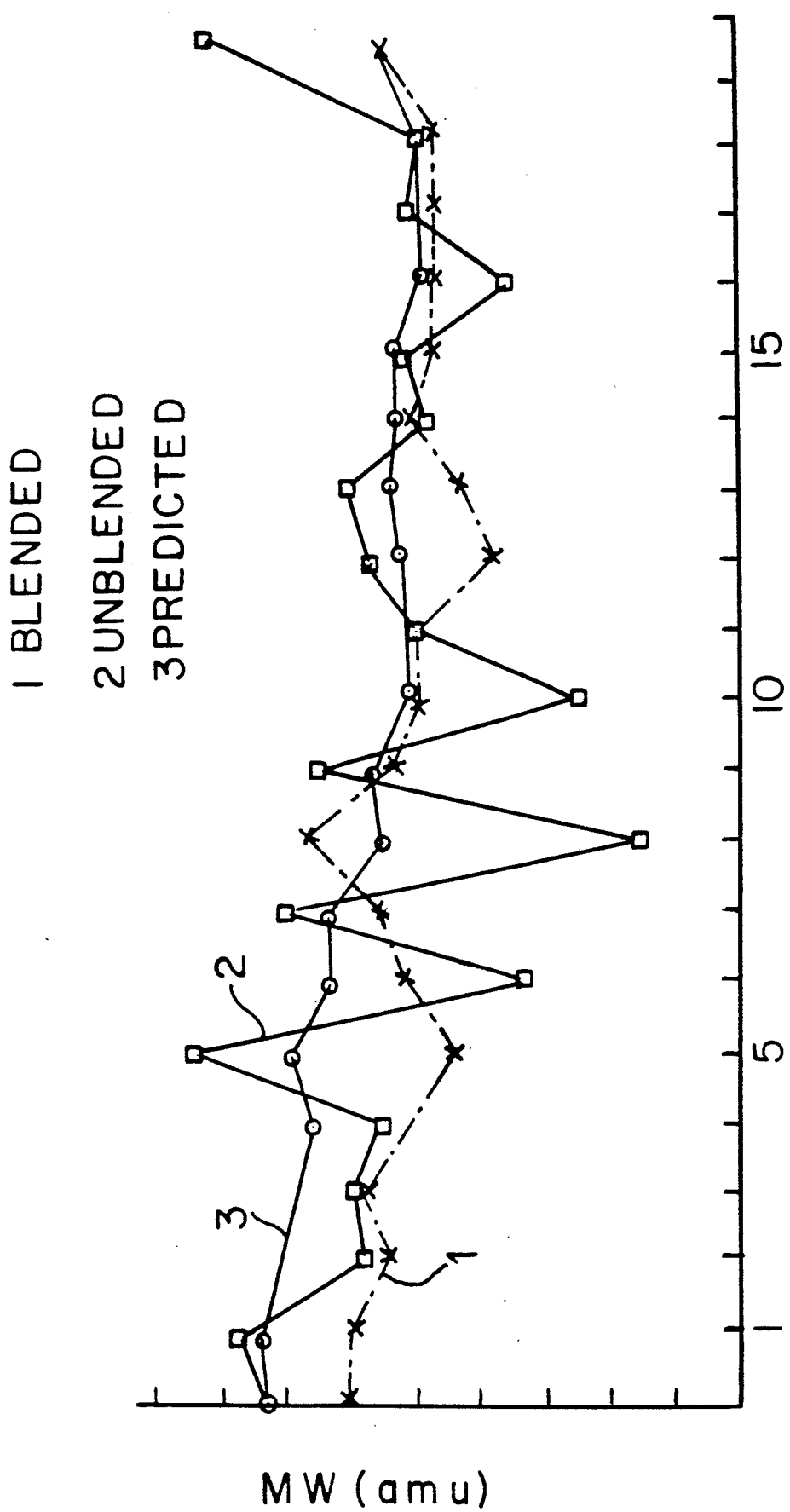
FIG. 4 is a comparison of the molecular weight variability before and after solution blending in accordance with the present invention with a calculated or predicted molecular weight variability.

FIG. 4 is a plot of the average molecular weight in atomic mass units versus the batch number of a series of batches (1-20) manufactured over a period of twenty (20) hours. Curve I represents the molecular weight average of the batches 1-20 measured after solution blending. Curve II represents the molecular weight of each individual batch prior to solution blending. Curve III represents the calculated or predicted average molecular weight of the batches 1-20 using a continuous stirred tank reactor (CSTR) mathematical model to predict the impact of blending multiple batches in a large vessel. The CSTR model is represented by the following equation $$Mw_t = Mw_{in} + (Mw_{t-1} - Mw_{in})e^{(-F/V)T}$$

where:
F = Feed Rate (gpm)
V = Tank Volume
T = Time $Mw_{in}$ = Molecular Weight of Individual Batch Input to Vessel
$Mw_t$ = Molecular Weight After Solution Blending
$Mw_{t-1}$ = Initial Charge The actual data from Curve I was used in the above equation.

The data is set forth below in Table 1.

TABLE 1

| Batch No.* | MW Blended | MW Unblended | MW Calculated |
|---|---|---|---|
| 1 | 17523 | 17838 | 17838 |
| 2 | 17503 | 17922 | 17853 |
| 3 | 17870 | 17431 | 17771 |
| 4 | 17458 | 17493 | 17718 |
| 5 | 17259 | 17358 | 17848 |
| 6 | 17089 | 18107 | 17787 |
| 7 | 17289 | 18827 | 17562 |
| 8 | 17384 | 17755 | 17588 |
| 9 | 17855 | 18370 | 17362 |
| 10 | 17333 | 17633 | 17414 |
| 11 | 17234 | 16628 | 17263 |
| 12 | 17248 | 17249 | 17280 |
| 13 | 18937 | 17422 | 17292 |
| 14 | 17065 | 17505 | 17333 |
| 15 | 17235 | 17205 | 17308 |
| 16 | 17183 | 17272 | 17301 |
| 17 | 17176 | 16876 | 17218 |
| 18 | 17170 | 17269 | 17227 |
| 19 | 17180 | 17249 | 17281 |
| 20 | 17357 | 17885 | 17358 |
| Average | 17281.4 | 17364.60 | 17445.16 |
| Std. Dev. | 171.24 | 445.17 | 212.55 |
| % Improved Std. Dev. | 260.0 | | |

MW - (amu) by GPC
*1 Batch per hour
MW Blended - Curve I FIG. 4
MW Unblended - Curve II FIG. 4
MW Calculated - Curve III FIG. 4

It can be appreciated from FIG. 4 that the predicted and actual average molecular weight of solution blended polycarbonate is generally in agreement except for perhaps the initial offset between Curves I and III. The curve illustrates that the large fluctuations in the batch-to-batch values is stabilized by the solution blending process both in theory and in practice.

The standard deviation ($\sigma$) is defined as the average of the differences of the various measurements from a mean (M) or average of all of the measurements. The mean is defined as $$\Sigma \frac{V_{1-n}}{n}$$

and the standard deviation is defined as $$\sigma = \Sigma \frac{M - d_{1-n}}{n}$$

where d represents the difference between the mean M and the actual value V.

In Table 1, the standard deviation ($\sigma$) about the average molecular weight is lowest for Curve I which indicates that the results are better than expected. The standard deviation for the polycarbonate on a batch-to-batch basis (Curve II) is about 2.6 times the standard deviation of the solution blended material (Curve I).

Table 2 represents a comparison of the actual molecular weight variability for batches 1-20 from FIG. 4 with the calculated yahes from Curve II for a one pass blend using the above noted mixing equation. Column IV represents the calculated value for solution blending with a second pass. One pass is calculated using a 20,000 gallon tank operating at 80 percent capacity with a 50 gallon per minute feed.

TABLE 2

| Time (hrs). | Batch 1-20 added 1 per hour | | |
|---|---|---|---|
| | MW Unblended | MW Calculated (one pass) | MW Calculated (2 passes) |
| 0.0 | | 17836 | 17466 |
| 1.0 | 17836 | 17836 | 17537 |
| 2.0 | 17922 | 17853 | 17598 |
| 3.0 | 17431 | 17771 | 17631 |
| 4.0 | 17493 | 17718 | 17648 |
| 5.0 | 17358 | 17649 | 17648 |
| 6.0 | 18107 | 17737 | 17665 |
| 7.0 | 16827 | 17562 | 17645 |
| 8.0 | 17755 | 17599 | 17636 |
| 9.0 | 16370 | 17362 | 17584 |
| 10.0 | 17633 | 17414 | 17551 |
| 11.0 | 16628 | 17263 | 17496 |
| 12.0 | 17249 | 17260 | 17450 |
| 13.0 | 17422 | 17292 | 17420 |
| 14.0 | 17505 | 17333 | 17403 |
| 15.0 | 17205 | 17308 | 17385 |
| 16.0 | 17272 | 17301 | 17369 |
| 17.0 | 16876 | 17219 | 17340 |
| 18.0 | 17529 | 17279 | 17328 |
| 19.0 | 17247 | 17273 | 17318 |
| 20.0 | 17357 | 17289 | 17312 |
| ave. | 17351 | 17466 | 17498 |
| std. | 428.97 | 222.19 | 129.99 |
| Cp(U) | 0.193 | 0.201 | 0.261 |
| Cp(L) | 0.117 | 0.399 | 0.765 |
| Cp K | 0.117 | 0.201 | 0.261 |
| Cp K% Improvement | | 171 | 131 |

In Table 2 one $\sigma$ or standard deviation is significantly reduced for one pass and further reduced for two passes. The values Cp(U) and Cp(L) and CpK are defined as follows:

$$Cp(U) = \frac{U - M}{3\sigma}$$

$$Cp(L) = \frac{M - L}{3\sigma}$$

$$CpK = \min(Cp(U), Cp(L))$$

U = Upper Specification Limit
L = Lower Specification Limit

As CpK increases the more likely the material will be within the specification limits, i.e., within RMW. As CpK decreases the probability that the material will be out of specification increases. From Table 2 it can be appreciated that the CpK for one pass is about 171% improved over the unblended results. The CpK for two passes is approximately 131% better than the one pass result and about 223% for the unblended results.

Figure 5:
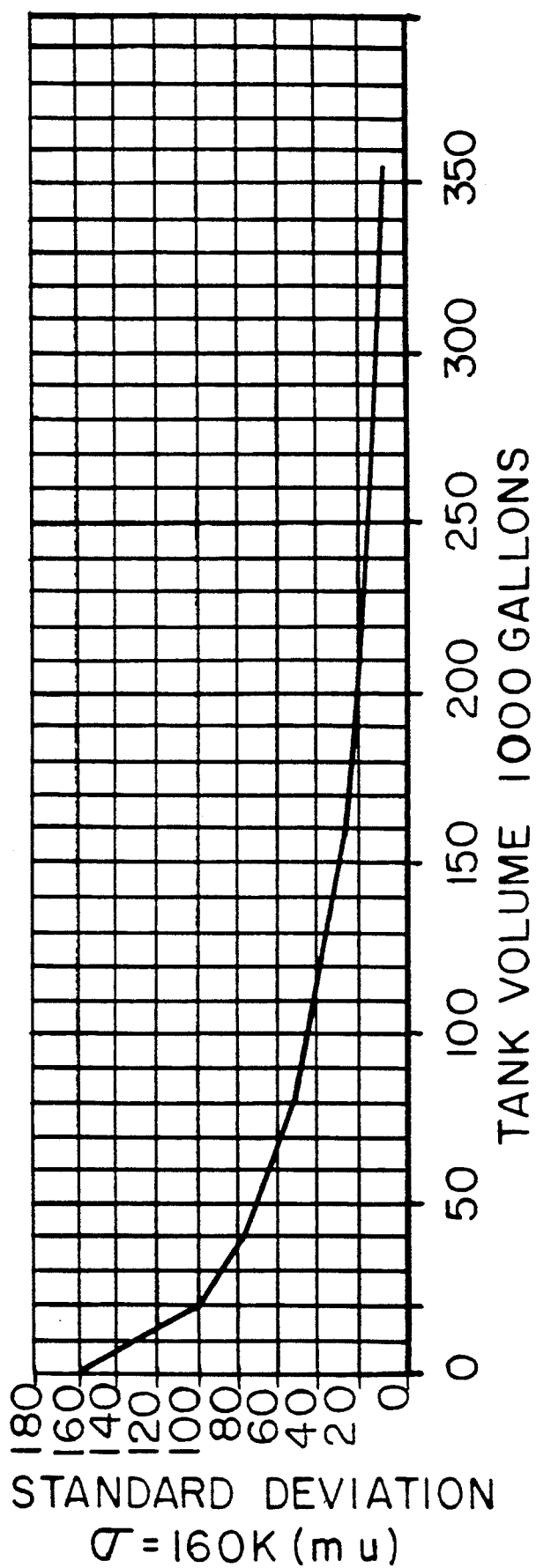
FIG. 5 is a graphical representation of the reduction in standard deviation (1 $\sigma$) for various solution blending tank volumes operating at a fixed flow rate.

FIG. 5 illustrates the relationship between the one $\sigma$ standard deviation and the volume of the tank 18 for a fixed flow rate. Zero tank volume represents an unblended product. The data clearly shows that the standard deviation drops exponentially. The most significant effect occurs with as little as a 20,000 gallon tank operating at a feed rate of 50 gallons per minute. As the tank size increases, thereby resulting in a higher residence time, the standard deviation continues to decrease exponentially. The greatest decrease in standard deviation occurs within about the first ten hours of residence time. The calculation for residence time is on a first in first out basis.

Table 3 is a comparison of four different molecular weight grades of polycarbonate with and without solution blending. Grade 1 has a polycarbonate having a molecular weight of about 24,000 amu±700 amu. Grade 2 is a polycarbonate material having a molecular weight of about 27,300 amu±900 amu. Grade 3 is a polycarbonate resin having a molecular weight of 30,400 amu ±800 amu. Grade 4 is a polycarbonate resin having a molecular weight of about 36,000 amu±1,500 amu.

TABLE 3

| | Comparison of Cp K with Solution Blending | | |
|---|---|---|---|
| Ex. | Mw Cp K Unblended | Mw Cp K blended (Average of 5) | % Improvement |
| 120 | 0.61 | 1.12 | 46 |
| 140 | 0.66 | 1.11 | 40 |
| 100 | 0.54 | 0.92 | 41 |
| 130 | 0.57 | 1.89* | 70 |

*Elevated due to sample set relative to the batch.

The MW CpK of unblended materials differs dramatically from the blended materials as illustrated by the percent improvement for five blended batches of each grade. A larger number of samples would, as illustrated as herein above, result in even greater improvement.

It has been found that a blend of polycarbonate (PC) dissolved in dichloromethane solvent at about 10 to about 30 weight percent solids of polycarbonate is an effective working range for the material. Higher solids concentrations of PC may be blended however the increased solids concentration raises the viscosity so that higher residence times are required. Lower concentrations of PC then about 10 percent are likewise effective but increase the vessel size requirements.

It has been found that batch-to-batch variability can be decreased by at least about 50 percent using solution blending in accordance with the present invention. Also, because the variability from batch-to-batch is reduced, the specification limits may likewise be reliably narrowed. Thus, lot-to-lot variations are likely to be less noticeable. The invention is applicable to polycarbonate materials in the molecular range from about 15,000 to about 100,000 amu regardless of which chain terminator, co-monomer or branching agents may be employed. The invention may be applied to reduce variations in such end capping, branched polycarbonates and combined co-monomers.

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

What is claimed is:

1. A process for treating polycarbonate to reduce batch-to-batch variations in viscosity, said process comprising:

mixing solutions of successive batches of polycarbonate dissolved in an organic solvent to form a solution containing from about 10 to about 30 weight percent solids;

blending said solution for a time period sufficient to reduce batch-to-batch variations in viscosity of said polycarbonate before recovery of said polycarbonate from said solution; and recovering said polycarbonate from said solution after said blending step.

2. A process according to claim 1, wherein said solution is blended at a temperature up to about 40° C.

3. A process according to claim 1, wherein said time period comprises up to about ten hours based upon a residence time of teach batch in a blending vessel on a continuous first in first out basis.

4. A process according to claim 1, wherein said polycarbonate has a molecular weight range of from about 15,000 to about 100,000 atomic mass units as determined by gel permeation chromatography.

5. A process according to claim 1, wherein said solution is blended in a continuous stirred tank reactor.

6. A process according to claim 1, wherein the polycarbonate to be treated has been produced by a batch interfacial polycarbonate process.

7. A process according to claim 1, wherein the organic solvent comprises dichloromethane.

8. The process of claim 1, wherein the variations in batch-to-batch viscosity after blending the solution improves by an amount ranging from about 40 to about 260%.

9. The process of claim 1, wherein the variation in viscosity has a standard deviation prior to the blending step and after the blending step and said standard deviation after said blending step is reduced by at least 40%.

10. The process of claim 9, wherein the reduction in variation in viscosity of the polycarbonate treated by said process is independent of chain termination, comonomers and branching agents in the polycarbonate to be treated by said process.

11. A method for decreasing batch-to-batch viscosity variability in polycarbonates comprising the steps of:

blending batches of polycarbonates in the molecular weight range of from about 15,000 to about 100,000 atomic mass units as determined by gel permeation chromatography dissolved in an organic solvent from about 10 to about 30 weight percent solids resulting in a decrease in batch-to-batch variability of at least about 40 percent.

12. The method according to claim 11, wherein the organic solvent comprises dichloromethane.

13. The method according to claim 11, wherein the standard deviation of the blend in comparison to an individual batch decreases in a range from about 40 to about 200 percent.

14. The method according to claim 11, wherein the decrease in variability of the polycarbonate treated by said method is independent of chain termination, comonomer or branching agents in the polycarbonate to be treated by said method.

* * * * *